United States Patent [19]
Kobayashi et al.

[11] Patent Number: 5,665,275
[45] Date of Patent: Sep. 9, 1997

[54] OPTICAL DEVICE AND OPTICAL APPARATUS INCLUDING SAME

[75] Inventors: Naoki Kobayashi, Tokyo; Shoichi Shimura; Kazuhiro Oki, both of Yokohama, all of Japan

[73] Assignee: Canon Kabushiki Kaisha, Tokyo, Japan

[21] Appl. No.: 749,726

[22] Filed: Nov. 15, 1996

Related U.S. Application Data

[63] Continuation of Ser. No. 799,183, Nov. 27, 1991, abandoned.

[30] Foreign Application Priority Data

Nov. 28, 1990 [JP] Japan .................. 2-322453

[51] Int. Cl.$^6$ .................. F21V 9/00; G02B 26/00; G02B 5/24
[52] U.S. Cl. .................. 252/582; 359/290; 359/886
[58] Field of Search .................. 252/582, 587, 252/589, 299.01; 359/290, 885, 886

[56] References Cited

U.S. PATENT DOCUMENTS

| | | | |
|---|---|---|---|
| 4,309,080 | 1/1982 | Hanchard et al. | 359/885 |
| 5,044,736 | 9/1991 | Jaskie et al. | 359/885 |
| 5,144,498 | 9/1992 | Vincent | 359/885 |
| 5,259,987 | 11/1993 | McArdle et al. | 252/299.01 |
| 5,266,238 | 11/1993 | Haacke et al. | 252/582 |
| 5,269,963 | 12/1993 | Uchida et al. | 252/299.01 |
| 5,271,866 | 12/1993 | Uchida et al. | 252/299.01 |
| 5,296,974 | 3/1994 | Tada et al. | 359/885 |

FOREIGN PATENT DOCUMENTS 41-11906  6/1966  Japan .

*Primary Examiner*—Philip Tucker
*Attorney, Agent, or Firm*—Fitzpatrick, Cella, Harper & Scinto

[57] ABSTRACT

An optical device functioning as a variable apex angle prism and suitable to be incorporated in an image stabilizing apparatus for an optical apparatus is constituted by a pair of transparent circular plates disposed oppositely spaced from each other, a connecting member attached to the circular plates so as to define a closed space in combination with the circular plates and deformable under application of an external drive force, and a transparent substance disposed within the closed space. The transparent substance comprises at least one compound selected from the group consisting of polyether-modified organopolysiloxane, polyether alcohol-modified organopolysiloxane and fluorine-containing compounds.

26 Claims, 6 Drawing Sheets

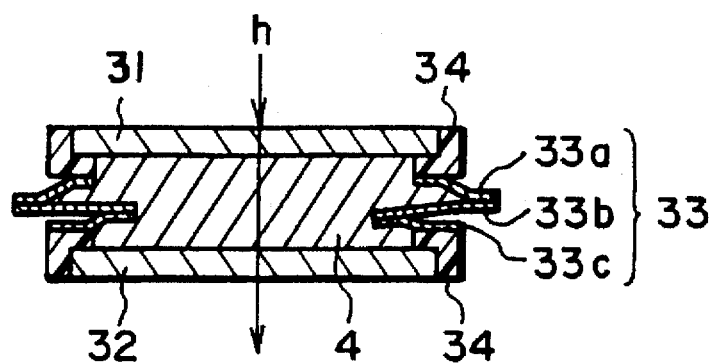
F I G. 8
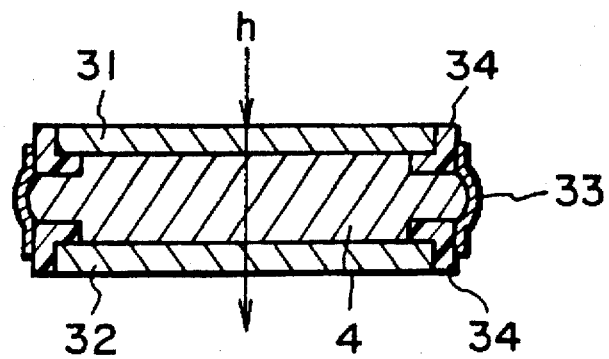
F I G. 9
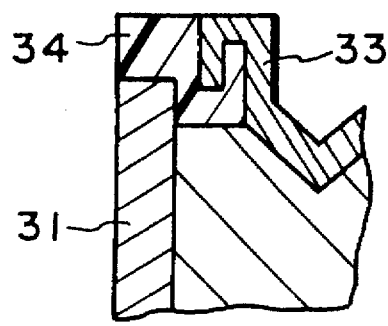
F I G. 10

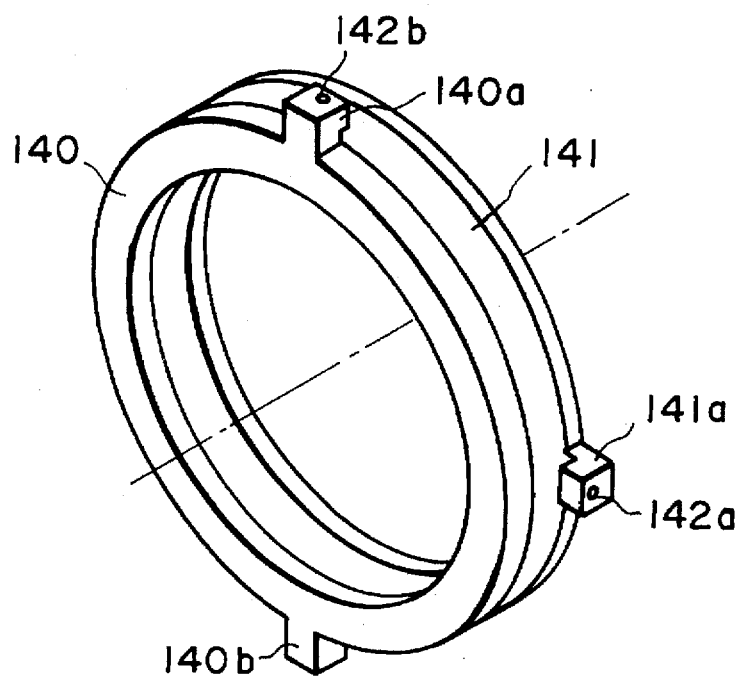
F I G. 14
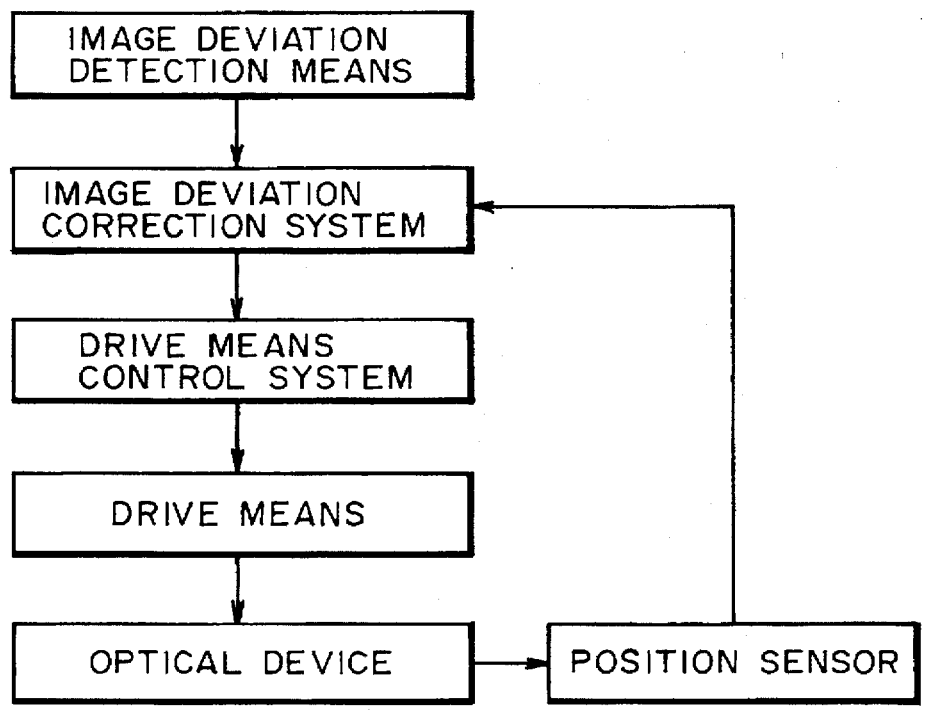
F I G. 15

OPTICAL DEVICE AND OPTICAL APPARATUS INCLUDING SAME

This application is a continuation of application Ser. No. 07/799,183 filed Nov. 27, 1991, now abandoned.

FIELD OF THE INVENTION AND RELATED ART

The present invention relates to an optical device formed by two transparent plates sandwiching an optically transparent substance so that a relative angle therebetween, i.e., an apex angle, can be changed to provide a light flux passing therethrough with a different action. The optical device may for example be suitable for constituting an anti-vibration optical system when disposed at a part in a photographic system, such as a still camera or a video camera, so as to correct an image deviation due to vibration of the photographic system.

In order to obtain a high-quality image by an optical instrument, such as a still camera, a video camera or a telescope including a focusing optical system for photographing or observing a still image or a moving image (hereinafter inclusively referred to as an "image") by focusing on an object, it is necessary to minimize a relative movement between the instrument and the object so as to avoid a displacement on the focal plane. For such a purpose of anti-vibration in a conventional optical instrument, there have been proposed various optical devices, acting as a variable apex angle prism, wherein a deformable optically transparent substance such as liquid or silicone rubber is hermetically disposed between two transparent plates and the angle (degree of parallelism) between the two plates is changed by an external driving force to deflect a light flux passing therethrough so as to prevent a displacement due to vibration of an image on a focal plane.

FIGS. 2A and 2B, for example, illustrate an optical device proposed by Japanese Patent Publication (JP-B) 41-11906. The optical device comprises two transparent flat plates 21 and 21a which are disposed opposite to each other and connected with each other with a flexible connecting member 22 at their periphery to leave a space which is hermetically filled with a transparent liquid 23. In response to a deviation or deflection of a light image on a focal plane of a camera, the angle between the two flat plates in the optical device is changed by an external drive force application means to form a variable apex angle prism capable of arbitrarily changing its apex angle so as to compensate for a displacement of the image on the focal plane by deflecting an incident light flux h by a prescribed angle to provide an exit light flux.

It is preferred that a transparent liquid or substance disposed in such an optical device satisfies the following properties:

a) Having a high Abbe's number (of, e.g., 45 or higher) so as to prevent color dispersion of the exit light flux having passed through the optical device.

b) Being free from variation in refractive index, opacification, denaturation or layer separation due to moisture absorption from the atmosphere.

c) Being free from decomposition at a high temperature (e.g., 80°–100° C.).

d) Not causing a substantial change in viscosity leading to a change in driving force of the optical device over a wide temperature range of from a low temperature (e.g., −20° C.) to a high temperature.

However, a conventionally used transparent substance, such as alcohol, ether or silicone oil, in such an optical device does not fully satisfy the above-mentioned properties and is not sufficient for providing the optical device with environmental stability or storage stability.

SUMMARY OF THE INVENTION

In view of the above-mentioned problems, an object of the present invention is to provide an optical device excellent in environmental stability and storage stability and capable of always providing good optical performances by preventing denaturation of an internally disposed substance due to environmental changes.

Another object of the present invention is to provide an image-stabilizing apparatus for stabilizing images in an optical instrument, such as a camera, a video camera, a television camera, binoculars or a telescope, equipped with an image forming optical system placed in a vibrating environment.

Another object of the present invention is to provide an optical apparatus capable of stabilizing an image formed on a focal plane by image-forming means even in a vibrating environment.

According to the present invention, there is provided an optical device, comprising: a pair of transparent circular plates disposed oppositely spaced from each other, a connecting member attached to the circular plates so as to define a closed space in combination with the circular plates and deformable under application of an external drive force, and a transparent substance disposed within the closed space; wherein said transparent substance comprises at least one compound selected from the group consisting of polyether-modified organopolysiloxane, polyether alcohol-modified organopolysiloxane and fluorine-containing compounds.

According to another aspect of the present invention, there is provided An image stabilizing apparatus for an optical apparatus having an image forming means for focusing on an object along a collimation axis, comprising:

an optical device comprising a pair of optically transparent circular plates disposed oppositely spaced apart from each other across the collimation axis of the optical apparatus, a connecting member attached to the circular plates so as to define a closed space in combination with the circular plates and a transparent substance filling the closed space, and transparent substance comprising at least one compound selected from the group consisting of polyether-modified organopolysiloxane, polyether alcohol-modified organopolysiloxane and fluorine-containing compounds;

detection means for responding to an angular movement and detecting the magnitude and azimuth of the angular movement; and drive means for driving the circular plates to incline the circular plates relative to each other in any direction with respect to the collimation axis so as to correct a displacement of an image on a focal plane in response to measured data from the detection means.

According to still another aspect of the present invention, there is provided an optical apparatus, comprising:

an image forming means for focusing on an object along a collimation axis, and an image stabilizing apparatus disposed in front of the image forming means with respect to a side of light incidence; said image stabilizing apparatus including:

an optical device comprising a pair of optically transparent circular plates disposed oppositely spaced apart from each other across the collimation axis of the optical apparatus, a connecting member attached to the circular plates so as to define a closed space in combination with the circular plates and a transparent substance filling the closed space, and transparent substance comprising at least one compound selected from the group consisting of polyether-modified organopolysiloxane, polyether alcohol-modified organopolysiloxane and fluorine-containing compounds;

detection means for responding to an angular movement and detecting the magnitude and azimuth of the angular movement; and drive means for driving the circular plates to incline the circular plates relative to each other in any direction with respect to the collimation axis so as to correct a displacement of an image on a focal plane in response to measured data from the detection means.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7–12 are schematic sectional views each showing another embodiment of the optical device according to the present invention.

FIG. 14 is a perspective view of a frame member for gripping the optical device according to the present invention.

FIG. 15 is a data flow diagram for operating an image-stabilizing apparatus according to the present invention.

DESCRIPTION OF THE PREFERRED EMBODIMENTS

Figure 1:
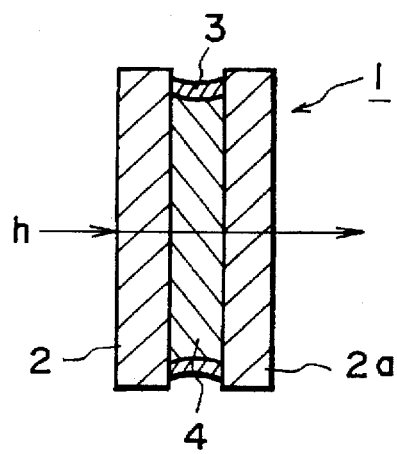
FIG. 1 is a schematic sectional view of an optical device according to the present invention.
Figure 2A:
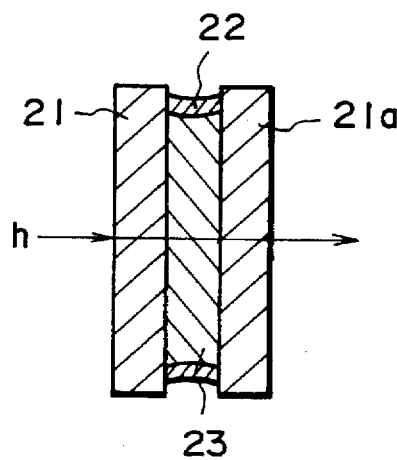
FIGS. 2A and 2B are illustrations of an optical device functioning as a variable apex angle prism.
Figure 2B:
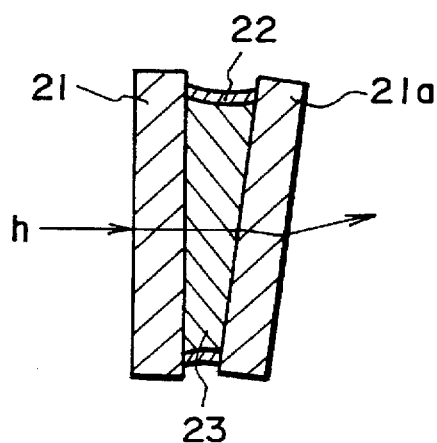

FIG. 1 shows an embodiment of the optical device according to the present invention. Referring to FIG. 1, an optical device 1 comprising optically transparent circular plates 2 and 2a each composed of independently glass, or a plastic material such as polycarbonate, polystyrene or polymethyl methacrylate. These circular plates are disposed so as to be almost parallel with each other in the absence of an external drive force. The periphery of the circular plates 2 and 2a are connected with a connecting member 3 of, e.g., a polymer film or a laminate of a polymer film with an aluminum foil. The connecting member 3 is closely attached to the circular plates 2 and 2a so as to define a closed space together with the circular plates 2 and 2a. The closed space is filled with a deformable optically transparent substance 4.

In the present invention, the optically transparent substance 4 filling the closed space is characterized by comprising at least one compound selected from the group consisting of polyether-modified organopolysiloxane, polyether alcohol-modified organopolysiloxane and fluorine-containing compounds.

In the present invention, the transparent substance selected from the above class may preferably have an Abbe's number of at least 45, particularly at least 50; a boiling point of at least 80° C., particularly at least 100° C.; a pour point of at most –20° C., particularly at most –30° C.; and a viscosity of at most 10 Poise at –20° C. By satisfying the above properties, it is possible to provide an organopolysiloxane causing minimum color dispersion of light flux having passed through the device and capable of operating stably over a wide temperature range.

The polyether-modified organopolysiloxane used as the transparent substance 4 in the present invention may for example be represented by the following formula (I):

Formula (I)

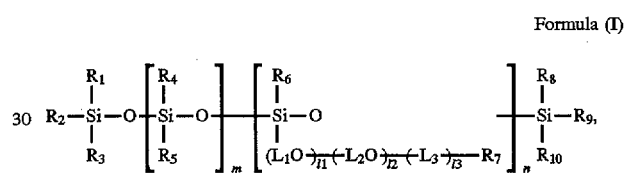

wherein $L_1$, $L_2$ and $L_3$ denote a $C_1$–$C_5$ alkylene group, or a derivative thereof, or a $C_1$–$C_5$ fluoroalkylene group or a derivative thereof; $R_1$–$R_{10}$ denote a substituted or unsubstituted alkyl group (e.g., methyl, ethyl, n-propyl, isopropyl, n-butyl, isobutyl, t-butyl), a substituted or unsubstituted alkenyl group, a substituted or unsubstituted alkinyl group, a substituted or unsubstituted aryl group, a substituted or unsubstituted aralkyl group, a substituted or unsubstituted fluoroalkyl group, a substituted or unsubstituted fluoroalkenyl group, a substituted or unsubstituted fluoroalkinyl group (e.g., perfluoromethyl, perfluoroethyl, perfluoro-n-propyl, perfluoro-isopropyl, perfluoro-n-butyl, perfluoro-isobutyl, perfluoro-t-butyl), a substituted or unsubstituted fluoroaryl group, or a substituted or unsubstituted fluoroaralkyl group, each having 1–10 carbon atoms; m and n are integers satisfying m+n≦50; and $1_1$, $1_2$ are independently 0 or an integer up to 50. The weight proportion of the polyether modifying group or segment $[(L_1O)_{1_1}$—$(L_2O)_{1_2}$—$(L_3$—$)_{1_3}$—$R_7]$ per molecule of the polyether-modified organopolysiloxane (hereinafter referred to as "modification degree") may preferably be 20–90 wt. %, particularly 25–80 wt. %. In the polyether-modified organopolysiloxane, the polysiloxane segment functions as a hydrophobic group and the polyether modifying segment functions as a hydrophilic group. Within the above-mentioned modification degree, moisture entering the optical device is captured within the polysiloxane molecule, so that no separation of water and the transparent substance occurs, thus preventing opacification in the optical device. Further, it is also possible to prevent the deformation of the optical device due to capturing of an excessive amount of moisture.

A preferred specific class of the polyether-modified organopolysiloxane may be represented by the following formula (I)-1:

Formula (I)-1

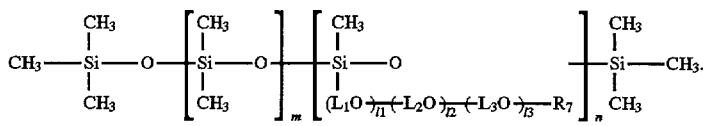

Particularly, a class of silicone oil obtained by introducing a polyether group into side chains of the dimethylpolysiloxane structure and represented by the formula (I)-2 below is free from occurrence of a refrax index distribution or opacification at the time of moisture absorption and excellent in durability at a high temperature, thus providing a high-quality optical device:

a wide temperature range of from a low temperature (e.g., $-20°$ C.) to a high temperature (e.g., $80°-100°$ C.).

The polyether alcohol-modified organopolysiloxane may preferably have a weight-average molecular weight of 900–1100, particularly 950–1050, so that it shows a low viscosity of at most 500 centi-poise over a wide temperature range (e.g., $-20°$ C. to $80°$ C.).

Formula (I)-2

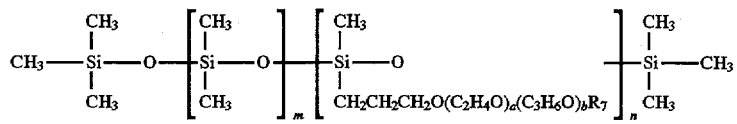

wherein a and b are 0 or an integer satisfying $a+b \leq 50$.

Next, the polyether alcohol-modified organopolysiloxane used in the present invention may for example be represented by the following formula (II) or (III):

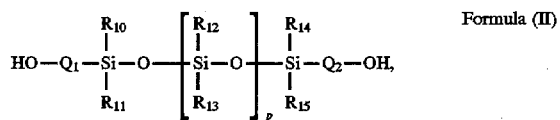

Formula (II)

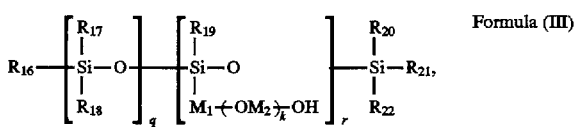

Formula (III)

wherein $M_1$ and $M_2$ denote a $C_1$–$C_5$ alkylene group, or a derivative thereof, or a $C_1$–$C_5$ fluoroalkylene group or a derivative thereof; $R_{10}$–$R_{22}$ denote a substituted or unsubstituted alkyl group (e.g., methyl, ethyl, n-propyl, isopropyl, n-butyl, isobutyl, t-butyl), a substituted or unsubstituted alkenyl group, a substituted or unsubstituted alkinyl group, a substituted or unsubstituted aryl group, a substituted or unsubstituted aralkyl group, a substituted or unsubstituted fluoroalkyl group, a substituted or unsubstituted fluoroalkenyl group, a substituted or unsubstituted fluoroalkinyl group (e.g., perfluoromethyl, perfluoroethyl, perfluoro-n-propyl, perfluoro-isopropyl, perfluoro-n-butyl, perfluoro-isobutyl, perfluoro-t-butyl), a substituted or unsubstituted fluoroaryl group, or a substituted or unsubstituted fluoroaralkyl group, each having 1–10 carbon atoms. Further, $Q_1$ and $Q_2$ denote a substituted or unsubstituted alkyl group, substituted or unsubstituted alkyl ether group, substituted or unsubstituted fluoroalkyl group, a substituted or unsubstituted fluoroalkyl ether group; and k, p, q and r denote 0 or a natural number, preferably up to 50.

The polyether alcohol-modified organopolysiloxane may preferably have an OH value (KOH mg/g) of at least 70, particularly at least 100–120, because it shows very little decrease in transmittance due to opacification (hereinafter simply referred to as "opacification") under high temperature—high humidity condition, is free from occurrence of a refractive index distribution even when it absorbs moisture under high humidity and retains a liquid state over Preferred classes of the polyether alcohol-modified organopolysiloxane may include, e.g., silicone oil having a primary alcohol OH group at both terminals of the dimethyl polysiloxane structure represented by the formula (II)-1 shown below or silicone oil having an alcoholic OH group in side chains of the dimethylpolysiloxane structure represented by the formula (III)-1 below:

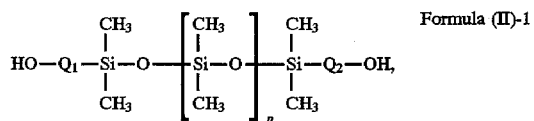

Formula (II)-1

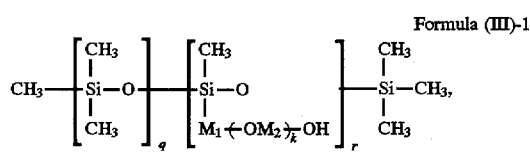

Formula (III)-1 wherein $Q_1$, $Q_2$, k, p, q and r are the same as defined above; and $Q_1$ and $Q_2$ may preferably be those represented by $(CH_2)_cO(CH_2)_d$ (c, d=1 to 5), and $M_1$ and $M_2$ may preferably be those represented by $(CH_2)_e$ (e=1 to 5), in view of the viscosity and stability of the modified silicone oil.

Next, the fluorine-containing compound used in the present invention refers to a substance generally in an aliphatic form containing a fluorine atom in its main chain or side chains. Such a fluorine-containing compound is susceptible of polarization because of the fluorine atom to have a generally large Abbe's number, so that it is suitably used as a material for the optical device. In view of excellent environmental and storage stability, suitable examples of the fluorine-containing compound may include:

Perfluoropolyether-modified fluorinated oils represented by the Formula (IV)-1 or (IV)-2 shown below:

$$CF_3-[(O-CF_2-CF_2)_s-(O-CF_2)_t]-O-CF_3.$$ Formula (IV)-1

$(s+t \leq 100)$

-continued $$CF_3(O-CF-CF_2)_u(O-CF_2)_v\cdot O-CF_3 \quad \text{Formula (IV)-2}$$
$$\phantom{CF_3(O-}|\phantom{}$$
$$\phantom{CF_3(O-}CF_3$$

$(u + v \leq 100)$

Perfluoroalkanes represented by the following Formula (IV)-3:

$$CF_3(CF_2)_w CF_3, \quad \text{Formula (IV)-3}$$

$(w = 5-10)$ or perfluoroalkenes, perfluoroalkines of the corresponding structure, and their derivatives, such as $$CF_3(CH)_w CF_3 \quad \text{and} \quad CF_3(CF)_w CF_3,$$
$$\phantom{CF_3(}|\phantom{CH)_w CF_3 \quad \text{and} \quad CF_3(}|\phantom{}$$
$$\phantom{CF_3(}CF_3 \phantom{CH)_w CF_3 \quad \text{and} \quad CF_3(}CF_3$$

Cyclo-perfluoroalkanes represented by the following formula (IV)-4:

$$C_jF_{2j} \quad \text{(j is an integer of at least 3),} \quad \text{Formula (IV)-4}$$

and cyclo-perfluoroalkanes and cyclo-perfluoroalkines of the corresponding structure, and their derivatives, such as

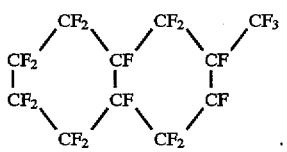

Perfluoromines represented by the following formula (IV)-5 and their derivatives:

$$C_yF_{2y+1} \quad \text{Formula (IV)-5}$$
$$|$$
$$C_xF_{2x+1}-N-C_zF_{2z+1} \quad (x, y, z = 1-6).$$

Perfluorofurans represented by the following formula (IV)-6 and their derivatives:

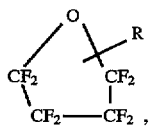

Formula (IV)-6 wherein R denotes a fluorine atom, fluoroalkyl group, fluoroalkenyl group, fluoroalkinyl group or fluoroaryl group.

Especially preferred examples of the fluorine-containing compound showing a high Abbe's number and excellent stability under high temperature—high humidity conditions may include: perfluoropolyether-modified fluorinated oil represented by the above formula (IV)-2 having no boiling point under the atmospheric pressure and having a pour point of −58° C., perfluorooctane having a boiling point of 97° C. and a pour point of −110° C., perfluorobutylperfluorofuran represented by the formula:

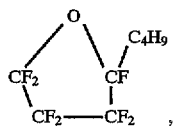

and having a boiling point of 102° C. and a pour point of −88° C., triperfluoropropylamine (N-(C₃F₇)₃) having a boiling point of 174° C. and a pour point of −50° C., triperfluorobutylamine (N-(C₄F₉)₃) having a boiling point of 215° C. and a pour point of −25° C., a perfluoroamine represented by the formula $$\phantom{C_4F_9-}C_4F_9 \quad CF_3$$
$$\phantom{C_4F_9-}|\phantom{C_4F_9\quad}|$$
$$C_4F_9-N-CF-C_2F_5,$$

and a cycloperfluoroalkane represented by the formula

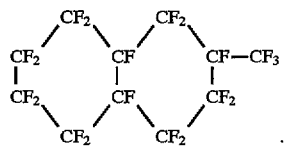

The above-mentioned silicone compounds and fluorine-containing compounds may be used singly or in mixture of two or more species.

Next, the shape of the optical device according to the present invention will be described with reference to the drawings.

Figure 3:
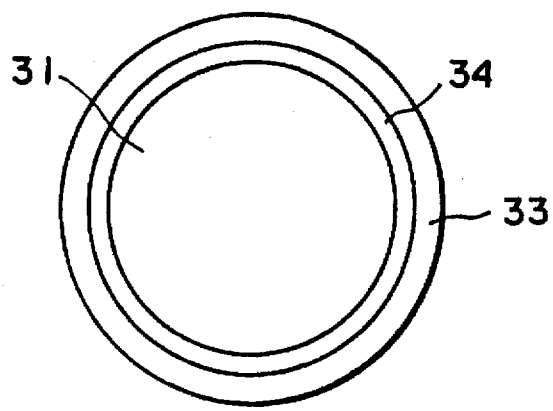
FIG. 3 is a plan view of an embodiment of the optical device according to the present invention.
Figure 4:
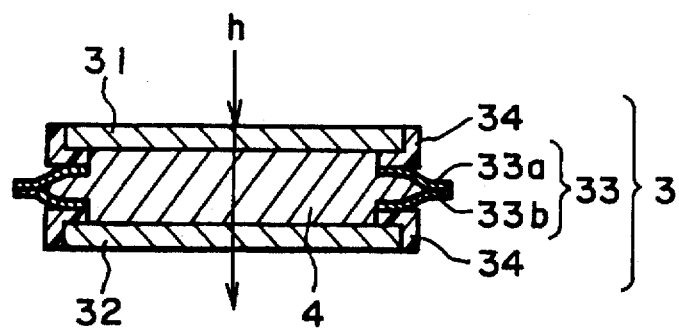
FIG. 4 is a schematic sectional view of the optical device shown in FIG. 3.

FIGS. 3 and 4 are a plan view and a sectional view of a second embodiment of the optical device according to the present invention. Referring to FIGS. 3 and 4, optically transparent circular plates 31 and 32 are oppositely spaced from each other and connected with a connecting member 3. The connecting member 3 comprises an annular film member 33 composed of a material having a softness and a flexibility such as a polymer film or an aluminum foil, and annular support members 34 disposed between the flat plated 31, 32 and the film member 33. The annular film member 33 comprises annular films 33a and 33b, which are bonded to each other at one end, and the other ends are bonded to the support members 34 so as to define a closed space together with the circular plates 31, 32.

The annular films 33a and 33b constituting the film member may comprise a material having a flexibility sufficient to allow the circular plates 31 and 32 to move relative to each other when an external drive force is applied to the optical device. Examples of the material may include: thermoplastic resins and thermosetting resins, such as polyethylene, polypropylene, polyvinyl chloride, polyamide, polystyrene, polyisobutylene, polycarbonate, polyvinylidene chloride, polyvinyl acetal, polymethyl methacrylate, polyacrylonitrile, polyimide, cellulose-type fluorine-containing resin, and epoxy resin, silicone resin; their copolymers, and mixtures thereof with a plasticizer or a filler.

Among these, rubbers or thermoplastic elastomers may suitably be used in respect of adhesiveness, liquid sealing property, and stretchability. Further, thermoplastic resins and thermosetting resins, which are rigid but show a flexibility when formed in a small thickness, are also suitably used because they can be deformed for driving at a small force when they are provided with an appropriate shape in addition to the above-mentioned film formability.

Among the above, silicone rubber, fluoro rubber or butyl rubber may be most suitably used since they have established bonding methods, show excellent solvent-resistance and stretch durability and allow a small deformation drive force.

The support member 34 may be composed of a rigid material, such as aluminum or a plastic material such as polyethylene. It is also possible to suitably use a composite material formed by insert molding of a metal, such as aluminum and stainless steel, glass fiber-reinforced polyester, and other composite materials formed by two-color molding, application with an adhesive, etc., providing the support member 34 with an enhanced rigidity effective for suppressing the deformation of the circular plates 31 and 32.

Figure 5:
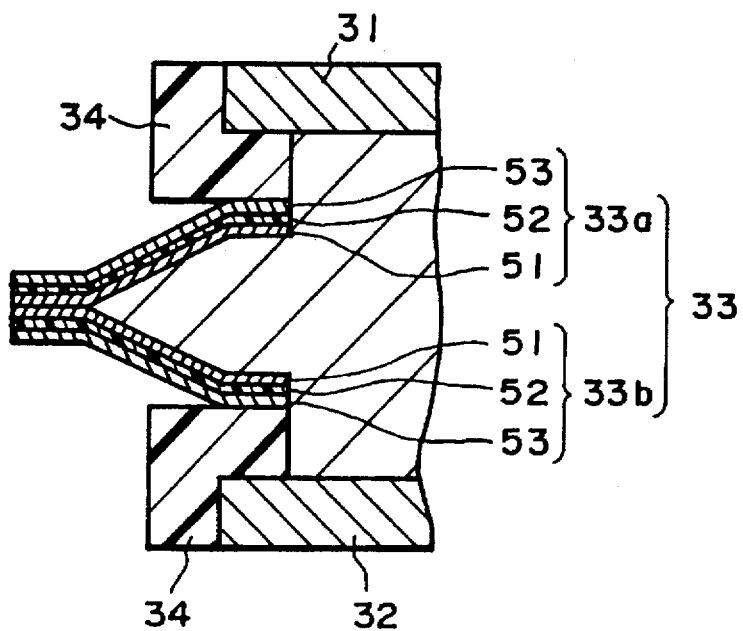
FIG. 5 is a partial schematic sectional view of another embodiment of the optical device according to the present invention.

In this instance, it is possible to compose the film member 33 in a three-layer structure as shown in FIG. 5. More specifically, each of the annular films 33a and 33b constituting the film member 33 may be composed to have a film adhesion layer 51 of bonding the annular films to each other, a barrier layer 52 for protecting an inner transparent substance 34 from moisture in the external environment and for retaining the strength of the film member 33, and a support member adhesion layer 53 for bonding the film member 33 to the support members 34. In construction, each of the annular films 33a and 33b is bonded to an associated one of the support members 34 with its adhesion layer 53, and then the film adhesion layers 51 disposed inwardly are bonded to each other to form a connecting member 3. According to this arrangement, the deformable part (film parts) may be bent at a moderate angle so as to allow a small deformation drive force.

The above-mentioned film adhesion layer 51 may preferably comprise a material which is not dissolved or swollen with the internal transparent substance 4 sealed up within the optical device and allows easy bonding of the films as by thermal melt-adhesion, ultrasonic melt-adhesion or by application with an adhesive. Film materials providing a pair of films thermally melt-bondable with each other may comprise, e.g., low-density polyethylene, linear low-density polyethylene, high-density polyethylene, medium-density polyethylene, polypropylene, polyamide and polyester, for which the thermal bonding method has been established.

It is also possible to use a film of a fluorine-containing polymer, such as polytetrafluoro-ethylene, polytrifluoroethylene, polyvinylidene fluoride, polyvinyl fluoride, tetrafluoroethylene-hexafluoropropylene copolymer, ethylenetetrafluoro-ethylene copolymer and tetrafluorooctylene-perfluoroalkyl vinyl ether copolymer. When such a fluorine-containing polymer film having a strong solvent-resistance is used, a transparent substance having a relatively strong swelling force against a film material can also be used.

The film adhesion layer 51 may preferably have a thickness of about 5–100 microns, more preferably 20–60 microns. If the thickness is below 5 microns, it is difficult to maintain a desired bonding strength because of possible deformation or thinning at the time of thermal melt-bonding. Above 100, the film is caused to have an increased rigidity to result in a large deformation drive force.

The barrier layer 52 has functions of preventing permeation of moisture or gas acting on the internal substance 4 and retaining the shape of the film member 33. An aluminum foil which shows a complete gas-shielding property and is inexpensive is a suitable material but some attention should be paid to the fact that an aluminum foil is liable to generate pinholes or repetitive deformation to have a poorer barrier characteristic and a thickness in excess of 50 microns causes an increased rigidity to result in an increased deformation drive force.

It is also possible to use a polyvinylidene chloride film or an aluminum-deposited polymer film showing excellent moisture barrier characteristic. It is also possible to use a film of polyvinyl alcohol, ethyl-vinyl alcohol copolymer, etc., showing a low-gas permeability. It is also possible to insert a film layer of nylon, etc., between the barrier layer 52 and the adhesion layer 51 or 53 in order to provide an increase in anti-piercing strength or anti-pinhole characteristic.

In case where a sufficient adhesion is not attained between the barrier layer and the adhesion layer 51 or 53, an intermediate layer of polyester, etc. may suitably be inserted between the barrier layer 52 and the adhesion layer 51 or 53 so as to provide an increased adhesion and prevent the occurrence of delamination on flexural repetition.

The support member adhesion layer 53 may preferably comprise a material similar to that of the support member 34 so as to provide a high thermal bonding strength. Accordingly, the material may be determined depending on a dimensional accuracy required of the support member 34. Examples of the material may include: polyester, polyamide, polycarbonate, polypropylene, low-density polyethylene, linear low-density polyethylene, medium-density polyethylene, high-density polyethylene, polypropylene, and polyvinyl chloride. The thickness may preferably be about 5–100 microns, particularly 20–60 microns. The reason for the thickness range is similar to that for the film adhesion layer 51.

The film adhesion layer 51 and support member adhesion layer 53 may preferably comprise a stretched film or unstretched film formed by casting, extrusion or inflation.

The film member 33 of a three-layer structure according to this embodiment may preferably have a thickness of at most 200 microns, more preferably 10–100 microns, in view of a decrease in deformation drive force. It is possible to form such a three-layer film constituting the annular film at one time by a three-layer co-extrusion method in case where the barrier layer comprises a polymer resin.

Figure 6:
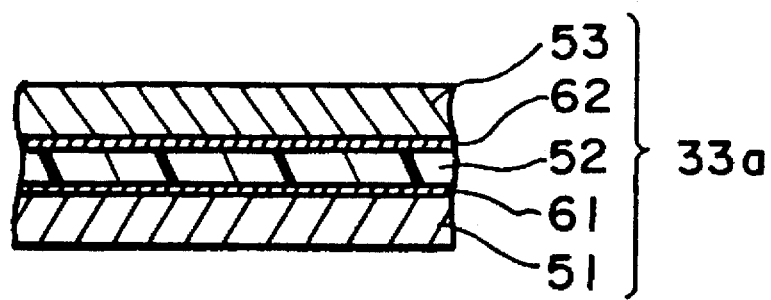
FIG. 6 is a schematic sectional view of an annular film used for a connecting member in the optical device of the present invention.
Figure 7:
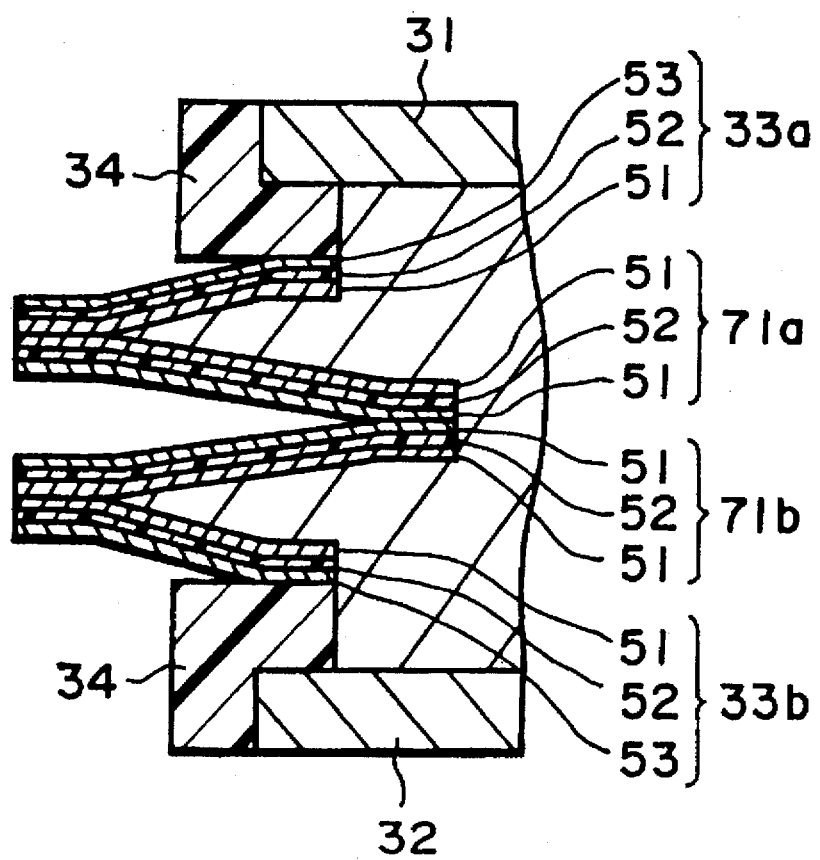

In case where the barrier layer 52 comprises an aluminum foil or a stretched plastic film, such a laminate film may be formed by dry lamination using adhesives 61 and 62 as shown in FIG. 6 or extrusion lamination using adhesives 61 and 62 of molten polyethylene to provide a good bonding strength. Such a laminate film 33a or 33b may also be formed by inflation capable of simultaneously forming the layers 51, 52 and 53, and also the layers 61 and 62 as desired.

Examples of such a three-layer laminate structure constituting the annular film 33a or 33b may include: polyester/Al/high-density polyethylene, polyester/nylon/low-density polyethylene, polyester/Al/polypropylene, polyamide/Al/high-density polyethylene, polyester/polyvinyl alcohol or ethylene-vinyl alcohol copolymer/polypropylene, polyamide/Al/polypropylene, linear low-density polyethylene/polyester/Al/polyester/linear low-density polyethylene, Al-deposited linear low-density polyethylene/polyester/Al-deposited linear low-density polyethylene, Al-deposited linear low-density polyethylene/Al-deposited polyester/Al-deposited linear low-density polyethylene, Al-deposited linear low-density polyethylene/Al-deposited polyester/linear low-density polyethylene, linear low-density polyethylene/fluorine-containing polymer/linear low-density polyethylene, linear low-density polyethylene/polyvinylidene chloride/linear low-density polyethylene, linear low-density polyethylene/polyvinyl alcohol or ethylene-vinyl alcohol copolymer/linear low-density polyethylene, linear low-density polyethylene/nylon/polyvinyl alcohol or ethylene-vinyl alcohol copolymer/linear low-density polyethylene, and linear low-density polyethylene/nylon/linear low-density polyethylene.

FIG. 3 shows a third embodiment of the optical device according to the present invention, wherein a film member 33 is constituted in the form of bellows by inserting a pair of annular films 71a and 71b each comprising a three layer structure of film adhesion layer 51/barrier layer 52/film adhesion layer 51 and bonded to each other between the annular film members 33a and 33b. It is also possible to adopt a film member 33 in the form of bellows as shown in FIG. 8 including annular laminate films 33a–33c or apply a film member 33 onto a peripheral side of a support member 34.

FIG. 10 shows another preferred embodiment wherein a support member 34 and a film member 33 are formed so as to fit each other, whereby the bonding area therebetween is increased to provide an optical device with a durable bonding.

Figure 11:
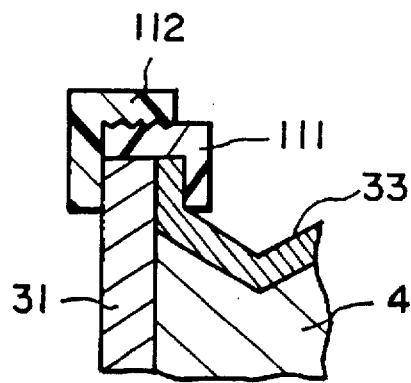

FIG. 11 shows another embodiment wherein two support members 111 and 112 are used with one member 111 fitting and bonded to a film member 33 and the other member 112 being screwed to the member 111 by preliminarily providing the support members with threads, whereby a tougher bonding is formed between the circular plate 31 and the film member 33.

Next, an embodiment wherein a circular plate and a film member 33 are directly bonded to each other, is explained.

Figure 12:
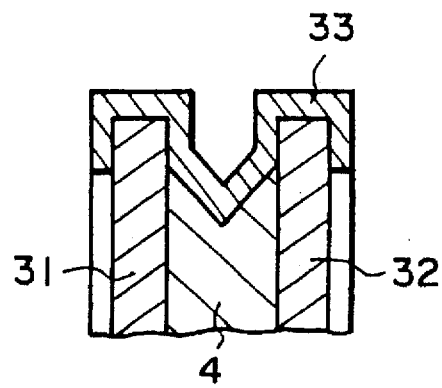

By taking advantage of a characteristic that the film member 33 is composed of a shapable or moldable material, the film member 33 may be preliminarily formed in a shape as shown in FIG. 12. As a result, the film member 33 can be fitted against and bonded to the circular plates 31 and 32, whereby a good bonding can be realized even when the circular plates and the film member show a poor adhesiveness with each other.

Figure 13:
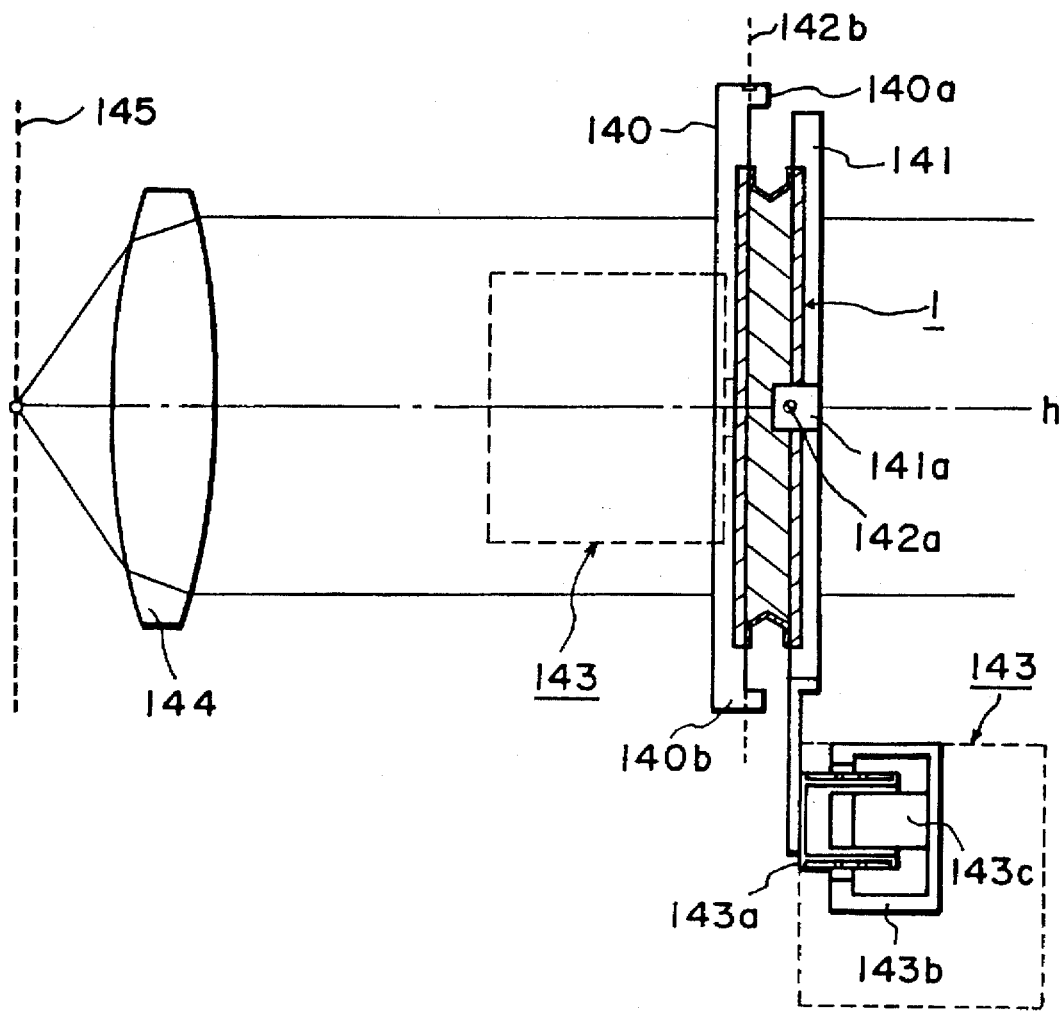
FIG. 13 is a schematic sectional illustration of an optical apparatus equipped with an image-stabilizing apparatus including an optical device according to the present invention.

FIG. 13 is a schematic sectional view of an optical apparatus equipped with an image-stabilizing apparatus incorporating an optical device according to the present invention. Referring to FIG. 13, an optical device 1 according to the present invention is held at its periphery with annular frame members 140 and 141 so that the circular plates 31 and 32 can be inclined relative to each other in any direction with respect to an optical axis h by a pair of drive member 143 connected to the frame members 140 and 141 and comprising a moving coil 143a, a yoke 143b and a magnet 143c, whereby an image-stabilizing apparatus is constituted.

As shown in FIG. 13 and better shown in FIG. 14, the frame members 140 and 141 have shaft supports 140a, 140b and 141a, 141b, respectively, for supporting the optical device 1 turnably about axes 142a and 142b with respect to a barrel (not shown) of the optical apparatus.

In this embodiment, the shaft supports are disposed projecting readily from the frame members 140 and 141 and deflected towards the opposite frame members 141 and 140, so that the turning axes 142a and 142b extends along diameters of the circular plates 31 and 32 on the inner surfaces thereof contacting the transparent substance. By the above arrangement, when the frame members are turned so as to change the apex angle of the optical device, the shaft support 140a or 141a does not touch the opposite frame member 141 or 140 to ensure a latitude of turning. The optical apparatus further includes a main lens system 144 as a means for forming an image on a focal plane 145.

The correction of image deviation of the optical apparatus may for example be performed according a data flow diagram as shown in FIG. 15.

More specifically, based on image deviation data detected by an image deviation detection means (not shown), such as an acceleration sensor, provided to the main body of the optical apparatus, an image deviation correction system and a drive means control system are successively operated to supply a current to the coil 143a, whereby a drive force required for operation of the drive means is generated.

Then, the circular plates 31 and 32 are turned about the axes 142a and 142b, respectively to vary the apex angle of the optical device. In this instance, the amount of the positional change is detected by a position sensor (not shown) and fed back to the image deviation correction system. According to the control system described above, an image deviation due to vibration of an optical apparatus can be well corrected.

As described above, according to the present invention, it has become possible to realize an optical device which retains a stable volume for a long period regardless of changes in external environmental conditions, shows a stable refractive index and is free from decomposition or coloring to provide always stable optical performances. Thus, the optical device can be suitably used in an anti-vibration system.

Hereinbelow, the present invention will be described more specifically based on Examples.

EXAMPLE 1

An optical device as shown in FIG. 5 was prepared.

Circular plates 31 and 32 were 2 mm-thick glass plates having a diameter of 50 mm. Annular films 33a and 33b were formed from a 70 micron-thick laminate film with a laminate structure of polyethylene/ethylene-vinyl alcohol copolymer/polyethylene and bonded to each other at their outer peripheral parts by thermal melt-bonding to form a film member 33 in the form of bellows. The film member 33 was then thermally melt-bonded to support members 34 formed by injection molding of polyethylene to form a connecting member which was then bonded to the circular plates 31 and 32 with an adhesive to form a closed space, which was then filled with 11 ml of a transparent substance 4 comprising a polyether alcohol-modified dimethylpolysiloxane represented by the following structural formula and having an Abbe's number of 52, a weight-average molecular weight of 1000, an OH value of 112, a refractive index of 1.42 and a viscosity at 25° C. of 33.1 (cs).

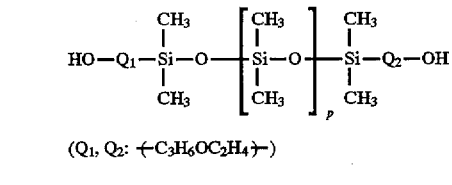

$(Q_1, Q_2: +C_3H_6OC_2H_4+)$

The environmental stability of the thus-obtained optical device was evaluated with respect to the following items ①–⑤.

① Changes in refractive index and weight under normal temperature—normal humidity.

The prepared optical device was left standing in an environment of 25° C. and 60% RH for 400 hours, during which the weight and refractive index were measured at intervals of 20 hours. For the refractive index measurement, plural sample devices were prepared and used, and a small amount of transparent substance was taken out of one sample at a time and measured by using a refractometer ("Refractometer Model 1", available from Atago K. K.).

As a result, the weight change was below ±0.1% over the period of 400 hours, thus showing no monotonous weight increase. The refractive index change was also within ±0.04% at all points of time.

② Weight change and refractive index change under high temperature—high humidity.

(1) The optical device was left standing under 45° C. and 95% RH for more than 72 hours until the weight change was saturated, whereby the maximum weight change was 1.4% and the refractive index change at that time was about −0.01% or even less, thus within a tolerable change in refractive index of ±0.04% compared from the initial value.

The optical device brought to saturation moisture absorption as described was placed under the conditions of 25° C.

and 65% RH and subjected to measurement by a Mach-Zehnder refractive index distribution meter, no refractive index distribution was observed over the extension of the optical device.

Then, the optical device once brought to saturation moisture absorption was left standing under 25° C. and 60% RH, whereby after 72 hours the weight of the optical device was returned to the original weight before the absorption ±0.1% and the refractive index was also returned to the range of the initial value ±0.04%.

Throughout the above standing test under the high temperature—high humidity conditions and the subsequent normal temperature—normal humidity conditions, the optical device showed a transmittance of 98% or higher according to measurements by a spectrophotometer ("U-4000" (trade name), available from Hitachi Seisakusho K. K.) and no opacification was observed. Further, no layer separation in the closed space was observed by naked eyes.

(2) When the optical device was left standing under the conditions of 75° C. and 85% RH for 500 hours, the weight increase was 15% at the maximum, and the refractive index was held within the range of the initial value ±0.04% with no refractive index distribution over the planar extension of the optical device.

The optical device thus subjected to saturation moisture absorption was left standing under 25° C. and 60% RH whereby after 72 hours the weight was returned to the weight before the absorption ±0.1% and the refractive index was returned to the initial refractive index ±0.04%.

③ High temperature standing test.

An optical device according to this Example was left standing under 80° C. and 60% RH for 3 months, no coloring or decomposition of the transparent substance was observed.

④ High temperature standing test after saturation moisture absorption.

The optical device subjected to saturation moisture absorption under the above conditions ② (1) was left standing under the conditions of 80° C. and 40% RH, whereby the transparent substance was always uniform and caused no phase separation.

⑤ Viscosity change

The modified dimethylpolysiloxane used in this Example showed a low viscosity of below 5 poise over a temperature range of −20° C. to 80° C. as measured according to JIS Z 8803.

EXAMPLES 2–5

Optical devices were prepared and evaluated in the same manner as in Example 1 except that the modified silicone oil used in Example 1 was replaced by polyether alcohol-modified silicone oils of Compounds Nos. 1–4 shown in Table 1 appearing hereinafter.

EXAMPLES 6–8

Optical devices were prepared and evaluated in the same manner as in Example 1 except that the modified silicone oil used in Example 1 was replaced by polyether alcohol-modified silicone oils of Compounds Nos. 5–7 shown in Table 2 appearing hereinafter.

EXAMPLES 9–12

Optical devices were prepared and evaluated in the same manner as in Example 1 except that the modified silicone oil used in Example 1 was replaced by fluorine-containing compounds of Compounds Nos. 8–11 shown in Table 3 appearing hereinafter.

TABLE 1

| Compound No. | Structural formula | OH value | Mw | Abbe's Number | Tb (°C.) | Tp (°C.) |
| --- | --- | --- | --- | --- | --- | --- |
| 1 | $HO-Q_1-Si(CH_3)_2-O-[Si(CH_3)_2-O]_p-Si(CH_3)_2-Q_2-OH$, $Q_1$: $-(C_3H_6OC_2H_4)-$, $Q_2$: $-(C_3H_6OC_2H_4)-$ | 100 | 1000 | 52 | — | <−30 |
| 2 | $HO-Q_1-Si(CH_3)_2-O-[Si(CH_3)_2-O]_p-Si(CH_3)_2-Q_2-OH$, $Q_1$: $-(C_3H_6OC_2H_4)-$, $Q_2$: $-(C_3H_6OC_2H_4)-$ | 80 | 1000 | 52 | — | <−30 |
| 3 | $CH_3-[Si(CH_3)_2-O]_q-[Si(CH_3)(C_3H_6OC_2H_4OH)-O]_r-Si(CH_3)_2-CH_3$ | 70 | 980 | 52 | — | <−30 |
| 4 | $HO-Q_1-Si(CH_3)_2-O-[Si(CF_3)(CH_3)-O]_p-Si(CH_3)_2-Q_2-OH$, $Q_1$: $-(CH_2OC_3H_6)-$, $Q_2$: $-(CH_2OC_3H_6)-$ | 120 | 1000 | 51 | — | <−30 |

Mw: weight-average molecular weight
Tb: boiling point
Tp: pure point

TABLE 2

| Compound No. | Structural formula | Modification degree (wt. %) | Abbe's Number | Tb | Tp (°C.) |
|---|---|---|---|---|---|
| 5 | $CH_3-Si(CH_3)_2-O-[Si(CH_3)_2-O]_m-[Si(CH_3)(\text{(CH}_2\text{)}_3\text{O(C}_2\text{H}_4\text{O)}_a\text{(C}_3\text{H}_6\text{O)}_b\text{R})-O]_n-Si(CH_3)_3$ (m = 27, n = 3, a = 23, b = 13, R: $C_4H_9$) | 76 | 56 | — | <−20 |
| 6 | same formula (a = 10, b = 5, R: $CH_3$) | 41 | 53 | — | <−20 |
| 7 | same formula (a = 6, b = 0, R: $CH_3$) | 29 | 53 | — | <−20 |

TABLE 3

| Compound No. | Structural formula | Abbe's number | Tb (°C.) | Tp (°C.) |
|---|---|---|---|---|
| 8 | $CF_3-[(O-CF(CF_3)-CF_2)_n-(O-CF_2)_m]-O-CF_3$ | 128 | — | −58 |
| 9 | $CF_3-(CF_2)_8-CF_3$ | 131 | 97 | −110 |
| 10 | cyclic: $CF_2-O-CF(C_4H_9)-CF_2-CF_2$ | 130 | 102 | −88 |
| 11 | $F_9C_4-N(C_4F_9)-C_4F_9$ | 128 | 174 | −50 |

COMPARATIVE EXAMPLES 1–2

Optical devices were prepared and evaluated in the same manner as in Example 1 except that the modified silicone oil used in Example 1 was replaced by polyethylene glycol (Mw=400) and silicone oil (Mw=1000).

REFERENCE EXAMPLE 1

Optical devices were prepared and evaluated in the same manner as in Example 1 except that a modified silicone oil represented by the same formula as the one used in Example 1 but having an OH value of 62 was used.

REFERENCE EXAMPLE 2

Optical devices were prepared and evaluated in the same manner as in Example 1 except that a modified silicone oil represented by the same formula as the one used in Example 4 but having an OH value of 59 was used.

REFERENCE EXAMPLE 3

Optical devices were prepared and evaluated in the same manner as in Example 6 except that a modified silicone oil having a modification degree of 11% was used.

The results of evaluation of the optical devices prepared in Examples 2–12, Comparative Examples 1–2 and Reference Examples 1–3 are summarized in Table 4 appearing hereinafter according to the following evaluation standards.

① Normal temperature—normal humidity
② High temperature—high humidity
Weight change
  AA: ≦5%
  A: >5% and ≦10%
  B: >10% and ≦15%
  C: >15%
R.I. ( refractive index ) change
  AA: ≦±0.04%
  A: >±0.04% and ≦±0.08%

B: >±0.08% and ≦0.1%
C: >±0.1%

Transmittance
AA: ≧98%
A: ≧95% and <98%
B: <95%
C: Opacified.

R.I. (refractive index) distribution
A: None
B: Observed

③ High temperature standing
A: No coloring
B: Coloring observed

④ High temperature standing after saturated moisture absorption
A: No layer separation
B: Layer separation observed ⑤ Viscosity change
A: ≦10 poise at −20° C.
B: >10 poise at −20° C.

selected from the group consisting of polyether-modified organopolysiloxane, polyether alcohol-modified organopolysiloxane and fluorine-containing compounds.

2. A device according to claim 1, wherein the transparent substance has an Abbe's number of at least 45.

3. A device according to claim 1, wherein the transparent substance has a boiling point of at least 80° C. and a pour point of at most −20° C.

4. A device according to claim 1, wherein the transparent substance has a viscosity of at most 10 poise at −20° C.

5. A device according to claim 1, wherein the polyether-modified organopolysiloxane contains 20–90 wt. % of a polyether-modifying group.

6. A device according to claim 1, wherein the polyether-modified organopolysiloxane contains 25–80 wt. % of a polyether-modifying group.

7. A device according to claim 1, wherein the polyether-modified organopolysiloxane has a structure represented by the following formula (I):

TABLE 4

| | ① | | ② | | | | | | |
|---|---|---|---|---|---|---|---|---|---|
| | Wt. change | R.I. change | Wt. change | R.I. change | Transmittance | R.I. distribution | ③ | ④ | ⑤ |
| Ex. 2 | AA | AA | (1) AA | AA | AA | A | A | A | A |
| | | | (2) AA | AA | AA | A | | | |
| Ex. 3 | AA | AA | (1) AA | AA | AA | A | A | A | A |
| | | | (2) AA | AA | A | A | | | |
| Ex. 4 | AA | AA | (1) AA | AA | AA | A | A | A | A |
| | | | (2) AA | AA | A | A | | | |
| Ex. 5 | AA | AA | (1) AA | AA | AA | A | A | A | A |
| | | | (2) AA | AA | AA | A | | | |
| Ex. 6 | AA | AA | (1) A | A | A | A | B | A | B |
| | | | (2) B | B | A | B | | | |
| Ex. 7 | AA | AA | (1) AA | A | A | A | B | B | B |
| | | | (2) A | A | B | A | | | |
| Ex. 8 | AA | AA | (1) AA | A | A | A | B | B | A |
| | | | (2) A | A | B | A | | | |
| Ex. 9 | AA | AA | (1) AA | AA | AA | A | A | A | A |
| | | | (2) AA | AA | A | A | | | |
| Ex. 10 | AA | AA | (1) AA | AA | AA | A | A | A | A |
| | | | (2) AA | AA | A | A | | | |
| Ex. 11 | AA | AA | (1) AA | AA | AA | A | A | A | A |
| | | | (2) AA | AA | A | A | | | |
| Ex. 12 | AA | AA | (1) AA | AA | AA | A | A | A | A |
| | | | (2) AA | AA | A | A | | | |
| Comp. Ex. 1 | C | C | (1) C | C | AA | B | B | A | ** |
| | | | (2) C | C | AA | B | | | |
| Comp. Ex. 2 | AA | AA | (1) AA | AA | C | — | A | A | A |
| | | | (2) AA | AA | C | — | | | |
| Ref. Ex. 1 | AA | AA | (1) AA | AA | AA | A | A | A | A |
| | | | (2) | AA | AA | B | A | | |
| Ref. Ex. 2 | AA | AA | (1) AA | AA | AA | A | A | A | A |
| | | | (2) AA | AA | B | A | | | |
| Ref. Ex. 3 | AA | AA | (1) AA | A | A | A | B | B | A |
| | | | (2) A | A | C | — | | | |

**Solidified at −10° C.

What is claimed is:

1. An optical device, comprising:
a pair of transparent plates disposed oppositely spaced from each other, a connecting member attached to the transparent plates so as to define a closed space in combination with the transparent plates and deformable under application of an external drive force, and a transparent substance disposed within the closed space; wherein said transparent substance is liquid at room temperature and comprises at least one compound

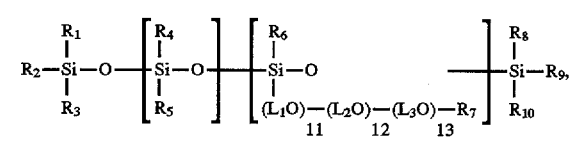

wherein $L_1$, $L_2$, and $L_3$ denote a $C_1$–$C_5$ alkylene group or a $C_1$–$C_5$ fluoroalkylene group; $R_1$–$R_{10}$ denote an alkyl group, an alkenyl group, an alkinyl group, an aryl group, an aralkyl group, an fluoroalkyl group, an fluoroalkenyl group, an fluoroalkinyl group, a fluoroaryl group, fluoroaralkyl group, each having 1–10 carbon atoms; m and n are integers satisfying m+n≦50; and 11, 12, 13 are independently 0 or an integer up to 50, so that segment $(L_1O)_{11}$—$(L_2O)_{12}$—$(L_3O)_{13}$—$R_7$ occupies 20–90 wt. % of the polyether-modified organopolysiloxane.

8. A device according to claim 7, wherein the polyether-modified organopolysiloxane is a polyether-modified dimethylpolysiloxane.

9. A device according to claim 8, wherein the polyether-modified dimethylpolysiloxane has a structure represented by the following formula:

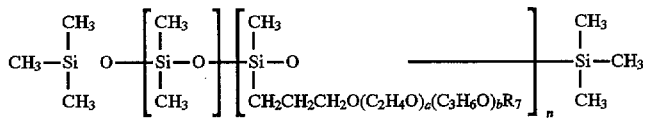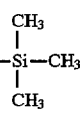

wherein a and b are 0 or an integer satisfying a+b≦50.

10. A device according to claim 1, wherein the polyether alcohol-modified organopolysiloxane has an OH value of at least 50.

11. A device according to claim 1, wherein the polyether alcohol-modified organopolysiloxane has an OH value of 100–120.

12. A device according to claim 1, wherein the polyether alcohol-modified organopolysiloxane is represented by the following formula (II) or (III):

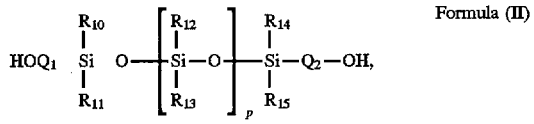

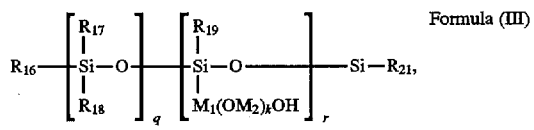

wherein $M_1$ and $M_2$ denote a $C_1$–$C_2$ alkylene group or a $C^1$–$C_5$ fluoroalkylene group; $R_{10}$–$R_{22}$ denote an alkyl group, an alkenyl group, an alkinyl group, an arly group, an aralkyl group, a fluoroalkyl group, a fluoroalkenyl group, a fluoroalkinyl group, a fluoroaralkyl group, each having 1–10 carbon atoms; $Q_1$ and $Q_2$ denote an alkyl group, an alkyl ether group, a fluoroalkyl group, a fluoroalkyl ether group; and k, p, q and r denote 0 or a natural number.

13. A device according to claim 12, wherein the polyether alcohol-modified organopolysiloxane is a polyether alcohol-modified dimethyl polysiloxane represented by the following formula (II)-1 or (III)-1:

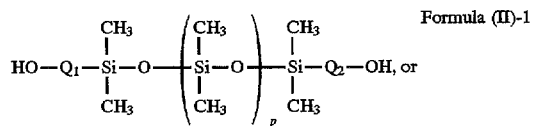

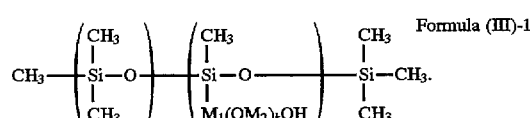

14. A device according to claim 13, wherein $Q_1$ and $Q_2$ in the formula (II)-1 are alkyl ether groups represented by $(CH_2)_cO(CH_2)_d$, wherein c and d are 1 to 5.

15. A device according to claim 13, wherein $M_1$ and $M_2$ in the formula (III)-1 are $-(CH_2)_e$ wherein e is 1 to 5.

16. A device according to claim 1, wherein the fluorine-containing compound is a compound selected from the group consisting of perfluoropolyether-modified fluorinated oils, perfluoralkanes, perfluoroalkenes, perfluoroalkines, cyclo-perfluoroalkanes, cyclo-perfluoroalkenes, cyclo-perfluoroalkines, perfluoroamines, and perfluorofurans.

17. A device according to claim 16, wherein the perfluoropolyether-modified fluorinated oils are represented by the following formula (IV)-1 or (IV)-2:

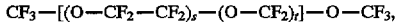

Formula (IV)-1

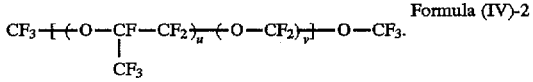

Formula (IV)-2 wherein the sum of s+t is less than or equal to 100, and the sum of u+v is less than or equal to 100.

18. A device according to claim 16, wherein the perfluoroalkanes are represented by the formula: $CF_3(CF_2)_wCF_3$, wherein w=5–10.

19. A device according to claim 16, wherein the perfluoroalkenes are represented by the formula: $C_jF_{2j}$, wherein j is an integer of at least 3.

20. A device according to claim 16, wherein the perfluoroamines are represented by the following formula:

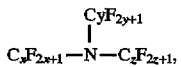

wherein x, y and z are 1–6.

21. A device according to claim 16, wherein the perfluorofurans are represented by the formula:

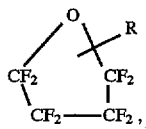

wherein R denotes a fluorine atom, fluoroalkyl group, fluoroalkenyl group, fluoroalkinyl group or fluoroaryl group.

22. An image stabilizing apparatus for an optical apparatus having an image forming means for focusing on an object along a collimation axis, comprising:
an optical device comprising a pair of optically transparent plates disposed oppositely spaced apart from each other across the collimation axis of the optical apparatus, a connecting member attached to the transparent plates so as to define a closed space in combination with the transparent plates and a transparent substance filling the closed space, said transparent substance being liquid at room temperature and comprising at least one compound selected from the group consisting of polyether-modified organopolysiloxane, polyether alcohol-modified organopolysiloxane and fluorine-containing compounds;

detection means for responding to an angular movement and detecting the magnitude and azimuth of the angular movement; and drive means for driving the transparent plates to incline the transparent plates relative to each other in any direction with respect to the collimation axis so as to correct a displacement of an image on a focal plane in response to measured data from the detection means.

23. An optical apparatus, comprising:

an image forming means for focusing on an object along a collimation axis, and an image stabilizing apparatus disposed in front of the image forming means with respect to a side of light incidence; said image stabilizing apparatus including:

an optical device comprising a pair of optically transparent plates disposed oppositely spaced apart from each other across the collimation axis of the optical apparatus, a connecting member attached to the transparent plates so as to define a closed space in combination with the transparent plates and a transparent substance filling the closed space, said transparent substance comprising at least one compound selected from the group consisting of polyether-modified organopolysiloxane, polyether alcohol-modified organopolysiloxane and fluorine- containing compounds;

detection means for responding to an angular movement and detecting the magnitude and azimuth of the angular movement; and drive means for driving the transparent plates to incline the transparent plates relative to each other in any direction with respect to the collimation axis so as to correct a displacement of an image on a focal plane in response to measured data from the detection means.

24. An optical device according to claim 1 wherein said transparent plates are transparent circular plates.

25. An optical device according to claim 22 wherein said transparent plates are transparent circular plates.

26. An optical device according to claim 23 wherein said transparent plates are transparent circular plates.

* * * * *

UNITED STATES PATENT AND TRADEMARK OFFICE
CERTIFICATE OF CORRECTION

PATENT NO. : 5,665,275

DATED : September 9, 1997

INVENTOR(S): NAOKI KOBAYASHI ET AL.

It is certified that error appears in the above-identified patent and that said Letters Patent is hereby corrected as shown below:

COLUMN 2

Line 36, "An" should read --an--.

COLUMN 4

Line 32, "$L_3$" should read --$L_3O$--.

COLUMN 5

Line 12, "refrax" should read --refractive--.

COLUMN 11

Line 54, "according" should read --according to--.

UNITED STATES PATENT AND TRADEMARK OFFICE
CERTIFICATE OF CORRECTION

PATENT NO. : 5,665,275

DATED : September 9, 1997

INVENTOR(S): NAOKI KOBAYASHI ET AL.

It is certified that error appears in the above-identified patent and that said Letters Patent is hereby corrected as shown below:

COLUMN 18

Line 60, "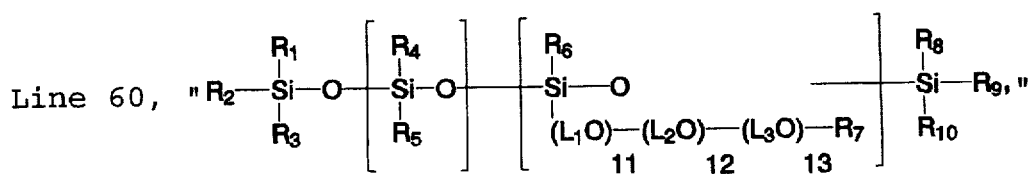"

should read

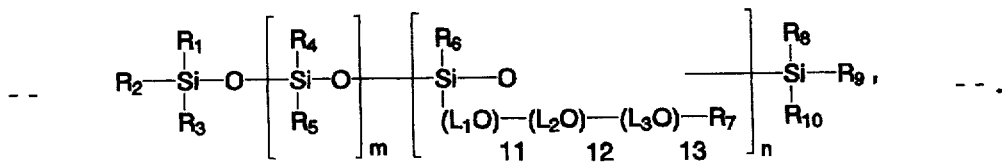

UNITED STATES PATENT AND TRADEMARK OFFICE
CERTIFICATE OF CORRECTION

PATENT NO. : 5,665,275

DATED : September 9, 1997

INVENTOR(S): NAOKI KOBAYASHI ET AL.

It is certified that error appears in the above-identified patent and that said Letters Patent is hereby corrected as shown below:

COLUMN 19

Line 1, "an" should read --a-- (all three times);
Line 2, "fluoroaralkyl" should read --a fluoroaralkyl--;
Line 43, "$C^1$—$C_5$" should read --$C_1$—$C_5$--.

COLUMN 20

Line 29, "the sum of" and "the" (last occurrence) should be deleted.
Line 30, "sum of" should be deleted.

Signed and Sealed this

Ninth Day of June, 1998

BRUCE LEHMAN

Attest:

Attesting Officer

Commissioner of Patents and Trademarks